(12) United States Patent
Kato et al.

(10) Patent No.: US 7,766,115 B2
(45) Date of Patent: Aug. 3, 2010

(54) ELECTRICAL COMPONENT ATTACHMENT STRUCTURE FOR TWO-WHEELED VEHICLE

(75) Inventors: Yuichi Kato, Wako (JP); Yuji Noguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 12/355,016

(22) Filed: Jan. 16, 2009

(65) Prior Publication Data

US 2009/0194356 A1 Aug. 6, 2009

(30) Foreign Application Priority Data

Jan. 31, 2008 (JP) ................................ 2008-021466

(51) Int. Cl.
*B62D 61/02* (2006.01)
(52) U.S. Cl. ...................... 180/219; 280/288.4; 180/312
(58) Field of Classification Search ................. 180/219, 180/312, 311; 280/288.4, 288.3
See application file for complete search history.

(56) References Cited

U.S. PATENT DOCUMENTS

| | | | |
|---|---|---|---|
| 4,171,731 A | * | 10/1979 | Hilber .......................... 180/219 |
| 4,556,119 A | * | 12/1985 | Shiratsuchi .................. 180/219 |
| 6,371,236 B1 | * | 4/2002 | Fukunaga ..................... 180/219 |
| 7,178,620 B2 | * | 2/2007 | Toyoda ......................... 180/227 |
| 7,258,186 B2 | * | 8/2007 | Okabe et al. .................. 180/219 |
| 7,588,009 B2 | * | 9/2009 | Kurokawa et al. ......... 123/193.5 |
| 2004/0255909 A1 | * | 12/2004 | Kurokawa et al. ........... 123/472 |
| 2005/0236204 A1 | * | 10/2005 | Ishikawa ..................... 180/219 |
| 2005/0263334 A1 | * | 12/2005 | Okabe et al. ................. 180/219 |
| 2008/0169134 A1 | * | 7/2008 | Tomolillo et al. .......... 180/6.24 |
| 2009/0050392 A1 | * | 2/2009 | Kakuta ......................... 180/219 |
| 2009/0194355 A1 | * | 8/2009 | Yamamoto et al. .......... 180/312 |
| 2010/0061058 A1 | * | 3/2010 | Tanabe et al. ................ 361/690 |

FOREIGN PATENT DOCUMENTS

JP 2005-219669 A 8/2005

* cited by examiner

*Primary Examiner*—Lesley Morris
*Assistant Examiner*—Tashiana Adams
(74) *Attorney, Agent, or Firm*—Westerman, Hattori, Daniels & Adrian, LLP

(57) ABSTRACT

A electrical component attachment structure for a two-wheeled motor vehicle includes a main frame supporting components of a vehicle body such as an engine, a pair of right and left center frames extending vertically behind the engine, and a rear swing arm swingably supported by a pivot shaft provided to the center frame. In this structure, a drive chain which transmits a driving force from the engine to a rear wheel is arranged along the rear swing arm. An electrical component is arranged on a vehicle inner side of the right and left center frames above the drive chain behind the engine.

8 Claims, 9 Drawing Sheets

ELECTRICAL COMPONENT ATTACHMENT STRUCTURE FOR TWO-WHEELED VEHICLE

TECHNICAL FIELD

The present invention relates to an electrical component attachment structure for a two-wheeled motor vehicle for attaching an electrical component in the inside of a vehicle body.

BACKGROUND OF THE INVENTION

As for conventional two-wheeled motor vehicles, there has been known a structure in which an electrical component such as a regulator is arranged above a transmission of an engine (for example, see Japanese Patent Application Publication No. 2005-219669). This regulator is connected to a modulator embedded in the transmission by wiring.

However, when the electrical component is arranged near the engine, the electrical component needs to be laid out in a position where the effect of heat is small. Thus, the degree of freedom in design regarding the arrangement thereof is limited. It is also not preferable to provide a heat shield component as a measure against heat.

When the balance of the vehicle body is taken into consideration, it is preferable to arrange accessories having large weights near the engine. However, the arranging of the electrical component above the transmission limits the space near the engine.

Further, since the vicinity of the engine is not covered by a side cover or the like, the electrical component can be seen from the outside of the vehicle, and the appearance may be spoiled.

SUMMARY OF THE INVENTION

The present invention has been made in view of the circumstance described above, and provides an electrical component attachment structure for a two-wheeled motor vehicle which allows the vicinity of an engine to be hardly affected by heat and leads to an improvement in the layout design near the engine.

The present invention provides an electrical component attachment structure for a two-wheeled motor vehicle including a main frame supporting components of a vehicle body such as an engine; a pair of right and left center frames extending vertically behind the engine; a rear swing arm swingably supported by a pivot shaft provided to the center frame; and a drive chain which transmits a driving force from the engine to a rear wheel and which is arranged along the rear swing arm. In this two-wheeled motor vehicle, an electrical component is arranged on a vehicle inner side of the right and left center frames above the drive chain behind the engine.

With this configuration, even if an accessory having a large weight is arranged near the engine, the electrical component can be arranged in a position relatively close to the engine, and the effect of heat from the engine can be reduced compared to the related art. Further, the electrical component can be attached in a position which is hardly seen from the outside due to the center frame.

The electrical component may be attached to the center frame on an opposite side of the vehicle body relative to an exhaust pipe arranged on one side of the vehicle body.

With this configuration, the influence of heat from the engine and the exhaust pipe can be reduced.

Further, an interference prevention member which restricts an upward movement of the drive chain may be provided between the drive chain and the electrical component.

With this configuration, the drive chain does not interfere with the electrical component.

Also, a bracket for attaching the electrical component to the center frame may be provided, and a rectifier capacitor may be attached to the bracket.

With this configuration, a component accompanying the electrical component can be attached collectively.

In the electrical component attachment structure for a two-wheeled motor vehicle according to the present invention, the electrical component is arranged behind the engine, on the vehicle inner side of the right and left center frames, and on the upper side of the drive chain. Thus, an accessory having a large weight can be arranged in the vicinity of the engine, and the center of gravity and balance of the vehicle body can be kept in a favorable state. Also, the electrical component can be arranged in a position relatively close to the engine while maintaining a good balance thereof, and arrangement with a main harness can be made easily. Further, since the electrical component can be hidden from the outside by the center frame, the electrical component is hardly seen from the exterior, thus improving the appearance.

Since the electrical component is attached to the center frame on the opposite side of the vehicle body as the exhaust pipe arranged on one side of the vehicle body, the effect of heat generated from the exhaust pipe can be reduced. Therefore, the reliability of the electrical component can be improved compared to the related art.

Further, since the interference prevention member which restricts the upward movement of the drive chain is provided between the drive chain and the electrical component, the drive chain first makes contact with the interference prevention member even if a trajectory of the drive chain comes close to the electrical component due to a swinging operation of the rear swing arm, a slack of the drive chain, or the like. Thus, the drive chain does not interfere with the electrical component. Accordingly, the reliability of the electrical component can be maintained in the same manner as in the related art.

BRIEF DESCRIPTION OF THE DRAWINGS

The advantages of the invention will become apparent in the following description taken in conjunction with the drawings, wherein:

FIG. 4 is obliquely seen from the right-front side of the vehicle body;

DETAILED DESCRIPTION OF THE INVENTION

Figure 1:
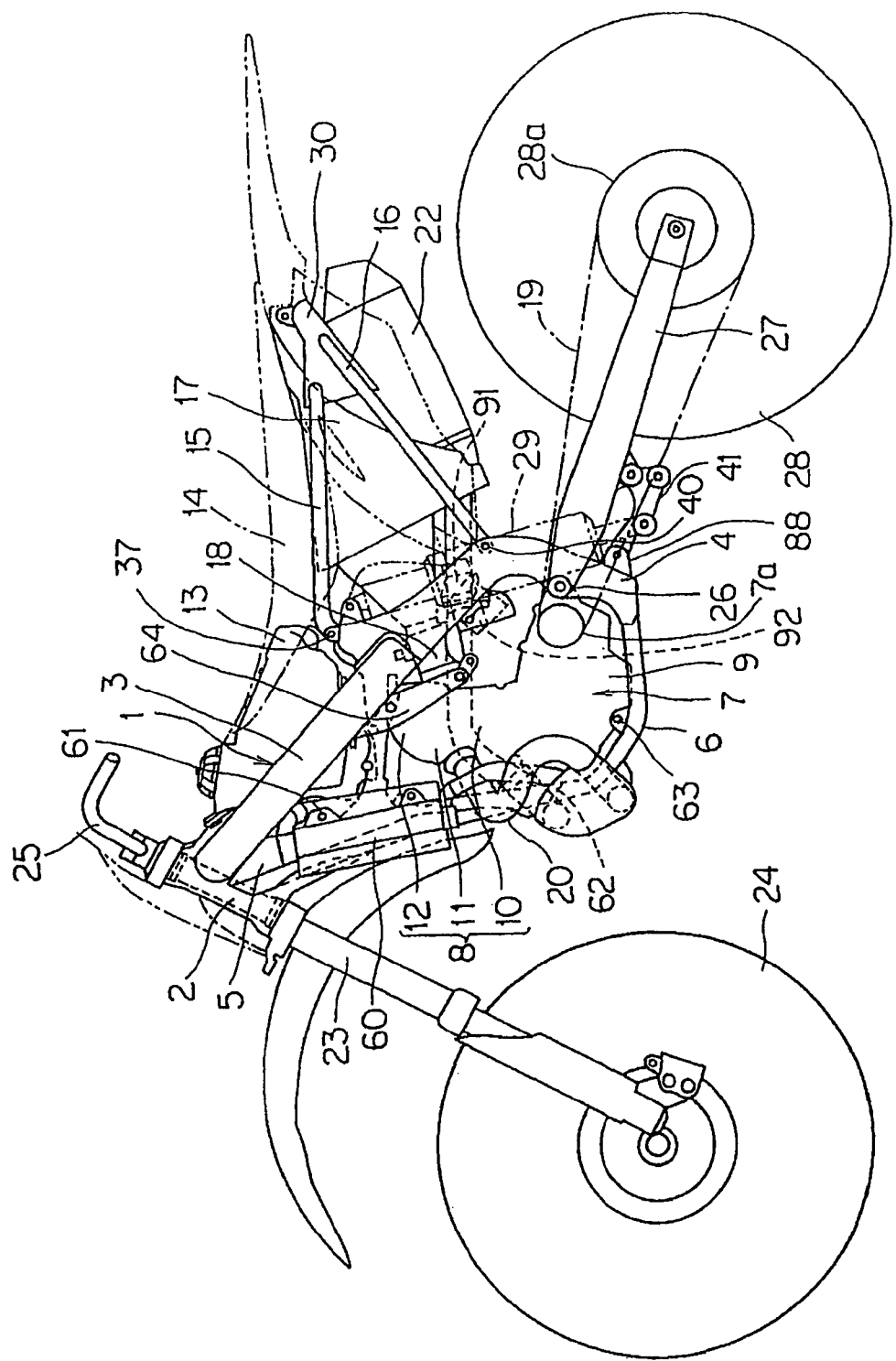
FIG. 1 is a side view of a two-wheeled motor vehicle according to an embodiment of the present invention.

Hereinafter, one embodiment will be described based on the drawings. FIG. 1 is a side view of an off-road two-wheeled motor vehicle including an electrical component attachment structure for a two-wheeled motor vehicle according to the embodiment of the present invention.

A vehicle body frame 1 of the two-wheeled motor vehicle includes a head pipe 2, a main frame 3, a center frame 4, a down frame 5, and a lower frame 6, which are connected in loop form to support an engine 7 in the inside thereof The engine 7 includes a cylinder 8 and a crank case 9. The main frame 3, the center frame 4, and the lower frame 6 are provided respectively in right and left as pairs, and the head pipe 2 and the down frame 5 are provided singularly along the center of the vehicle body.

The main frame 3 extends above the engine 7 obliquely downward and rearward in straight line, and is connected to an upper end section of the center frame 4 extending in the vertical direction behind the engine 7. The down frame 5 extends obliquely downward and rearward in front of the engine 7, and a lower end section of the down frame 5 is connected to a front end section of the lower frame 6. At a front side lower section of the engine 7, the lower frame 6 bends to extend rearward below the engine 7 approximately linearly. A rear end section of the lower frame 6 is connected to a lower end section of the center frame 4.

The engine 7 employs, for example, a water-cooled four-stroke system. The cylinder 8 is provided to a front section of the crank case 9 in an upright state in which the cylinder axis thereof is approximately vertical, and includes a cylinder block 10, a cylinder head 11, and a head cover 12 in this order from bottom to top. When the cylinder 8 is upright, the engine 7 is shortened in the front-back direction to make the configuration of the engine 7 suitable for an off-road vehicle.

Above the engine 7, a fuel tank 13 is arranged and supported on the main frame 3. Inside the fuel tank 13, a built-in fuel pump is stored, and high-pressure fuel is supplied from the fuel pump to a throttle body 18 via a fuel supply pipe.

A seat 14 is arranged behind the fuel tank 13 to be supported on the seat rail 15 extending rearward from the upper end of the center frame 4. Below the seat rail 15, a rear frame 16 is arranged. The seat rail 15 and the rear frame 16 support an air cleaner 17, whereby air is taken in from the rear side of the vehicle body to the cylinder head 11 via the throttle body 18.

In the front section of the cylinder 8, an exhaust pipe 20 is provided. The exhaust pipe 20 extends from the front section of the cylinder 8 to the front of the crank case 9, bends toward the right, and is then drawn around to be directed rearward on the right side of the vehicle body. A muffler 22 extends rearward from the exhaust pipe 20. A rear end section of the muffler 22 is supported by the rear frame 16.

The head pipe 2 supports a front fork 23, and a front wheel 24 supported by a lower end section of the front fork 23 is steered by a handle 25. A front end section of a rear swing arm 27 is swingably supported by the center frame 4 by a pivot shaft 26. A rear end section of the rear swing arm 27 supports a rear wheel 28, which is driven by a drive chain 19 wound around a drive sprocket 7a of the engine 7 and a driven sprocket 28a of the rear wheel 28. The drive chain 19 is arranged on the left side of the vehicle body which is the opposite side of the exhaust pipe 20, extends along the rear swing arm 27 in the front-back direction, and moves vertically in accordance with vertical swinging movements of the rear swing arm 27 that swings around the pivot shaft 26. Between the rear swing arm 27 and a rear end section of the center frame 4, a cushion unit 29 of a rear suspension is provided.

Note that, in FIG. 1, reference numeral 60 denotes a radiator, 61 denotes a rubber mount section, 62 and 63 denote engine mount sections, and 64 denotes an engine hanger.

Figure 2:
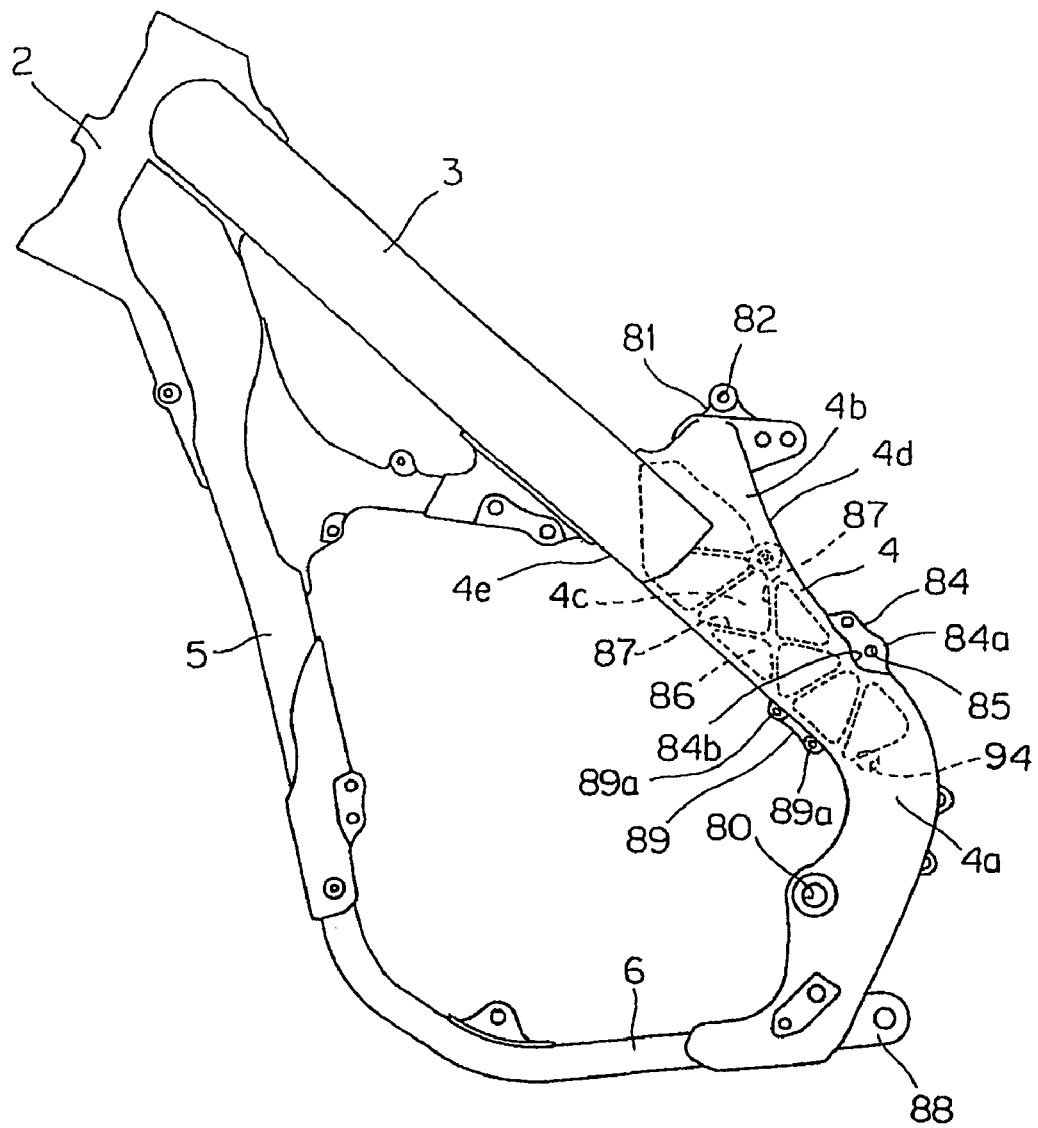
FIG. 2 is a side view of a vehicle body frame.

FIG. 2 is a side view of the vehicle body frame 1. Note that the center frame 4 is horizontally symmetrical, and has common shapes on the right and left portion unless stated in particular.

In the body frame 1, as described above, the main frame 3, the center frame 4, the down frame 5, and the lower frame 6 are connected in loop form in an approximately triangular shape, and the engine 7 is supported inside this triangle.

Of these, as shown in FIG. 2, the right and left pair of the center frames 4 on the rear side of the vehicle body extend vertically, and include bend sections 4a bent in V-shapes having vertical center sections thereof directed rearward of the vehicle body.

On a slightly lower side of the bend section 4a, a pivot hole 80 to which the pivot shaft 26 is attached is formed.

On a slightly upper portion of the bend section 4a and the upper surface side of the center frame 4, a concave section 84 to which one end section of the rear frame 16 is attached is provided. The concave section 84 is configured of an attachment surface 84a in which an outside surface 4b of the center frame 4 is depressed inward of the vehicle body, and a cutout wall section 84b in which an upper surface 4d of the center frame 4 is cut out in an arc shape directed obliquely frontward and downward. The attachment surface 84a is provided with an attachment hole 85 penetrating in the vehicle body width direction.

On the opposite side of the concave section 84 and on a lower surface 4e side of the center frame 4, a flange section 89 for attaching an electrical component bracket 90 (described later) protrudes forward and to the lower side of the vehicle body. The flange section 89 is formed with two attachment holes 89a.

Below the flange section 89, an attachment hole 94 for attaching a chain roller 93 (described later) is formed.

The flange section 89 and the attachment hole 94 are provided only in a center frame 4L on the left side of the vehicle body (hereinafter, reference numeral 4L denotes the center frame on the left side, reference numeral 4R denotes the center frame on the right side, and the suffixes L and R are not shown when referring to both of the center frames) of the pair of center frames 4.

On the lower end section of the center frame 4, a tension bracket 88 is provided. The cushion unit 29 is attached to the tension bracket 88 through a link mechanism 41 (see FIG. 1).

On the upper end section of the center frame 4, in a connection section with a rear end section of the main frame 3, a seat rail supporting section 81 is formed. The seat rail supporting section 81 is provided to each of the right and left center frames 4 to protrude upward from the upper surface 4d. An attachment hole 82 is formed in each seat rail supporting section 81.

An inside surface 4c of the center frame 4 is depressed toward the outside of the vehicle body to form plural concave sections 86 for reducing weight of the center frame 4. Between the adjacent concave sections 86, plural ribs 87 for enhancing rigidity of the center frame 4 are provided in a truss form.

Figure 3:
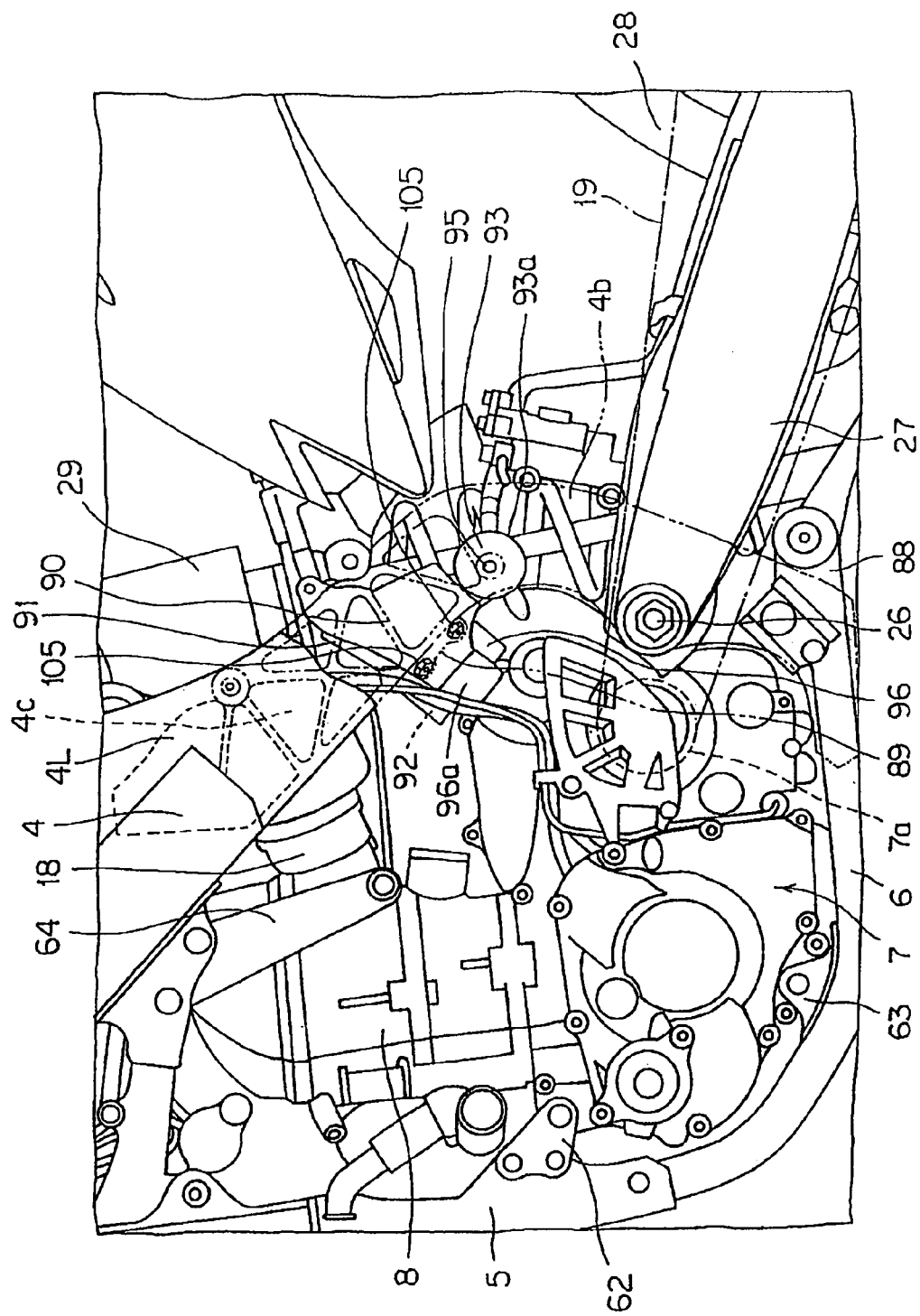
FIG. 3 is an enlarged side view of the vicinity of a center frame shown in FIG. 1.
Figure 4:
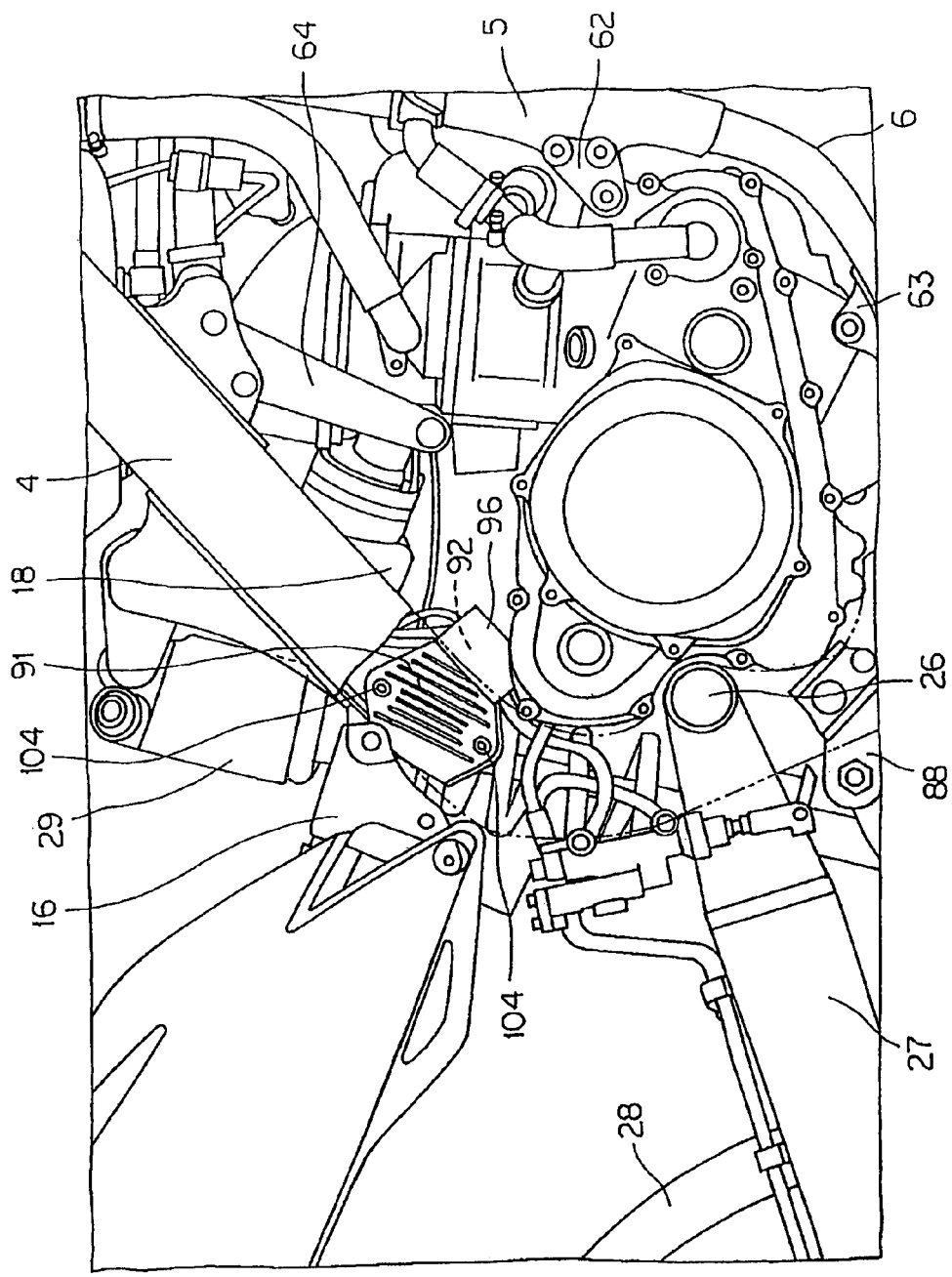
FIG. 4 is a side view of FIG. 3 when seen from an opposite side of the vehicle body.
Figure 5:
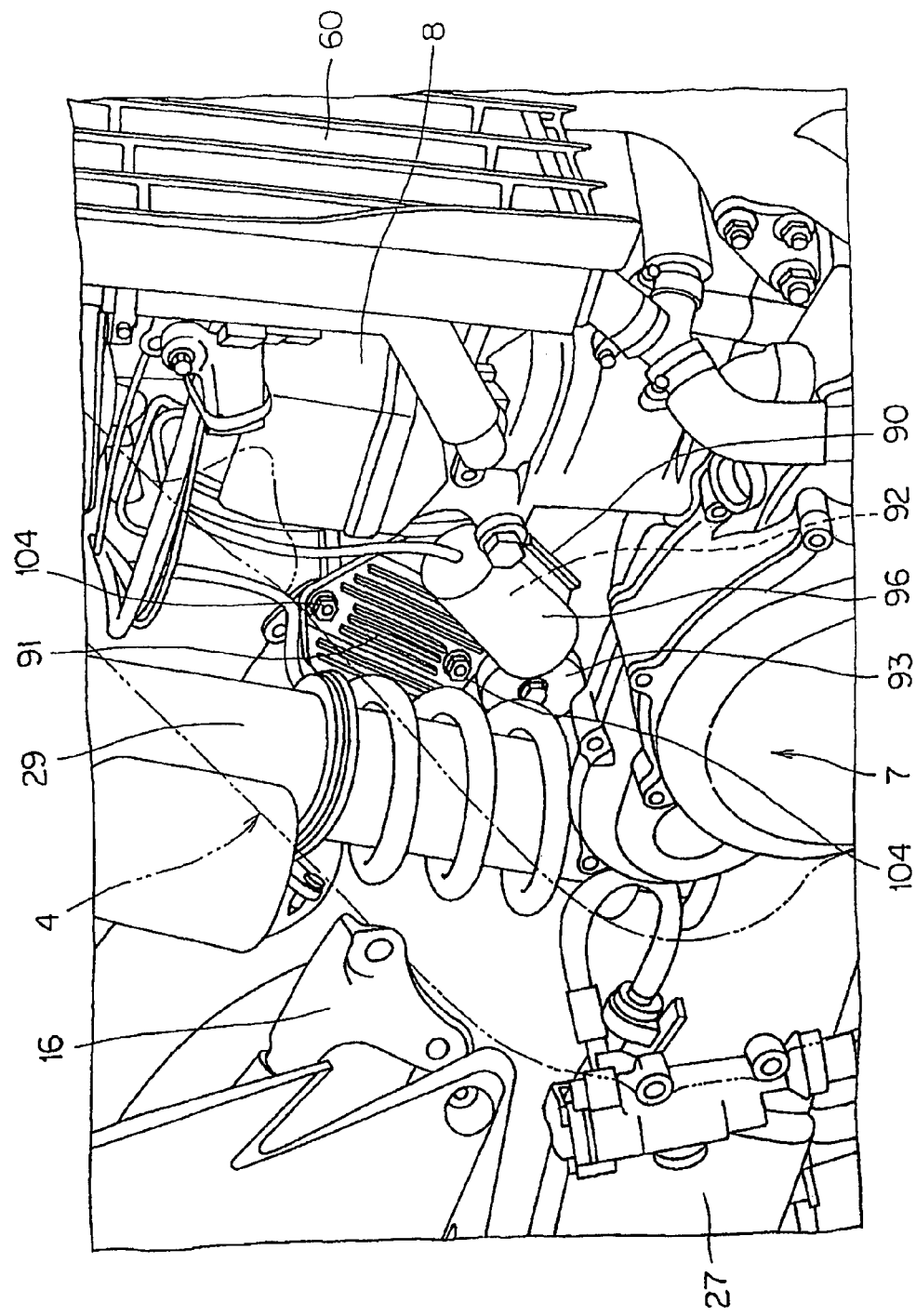
FIG. 5 is a perspective view when
Figure 6:
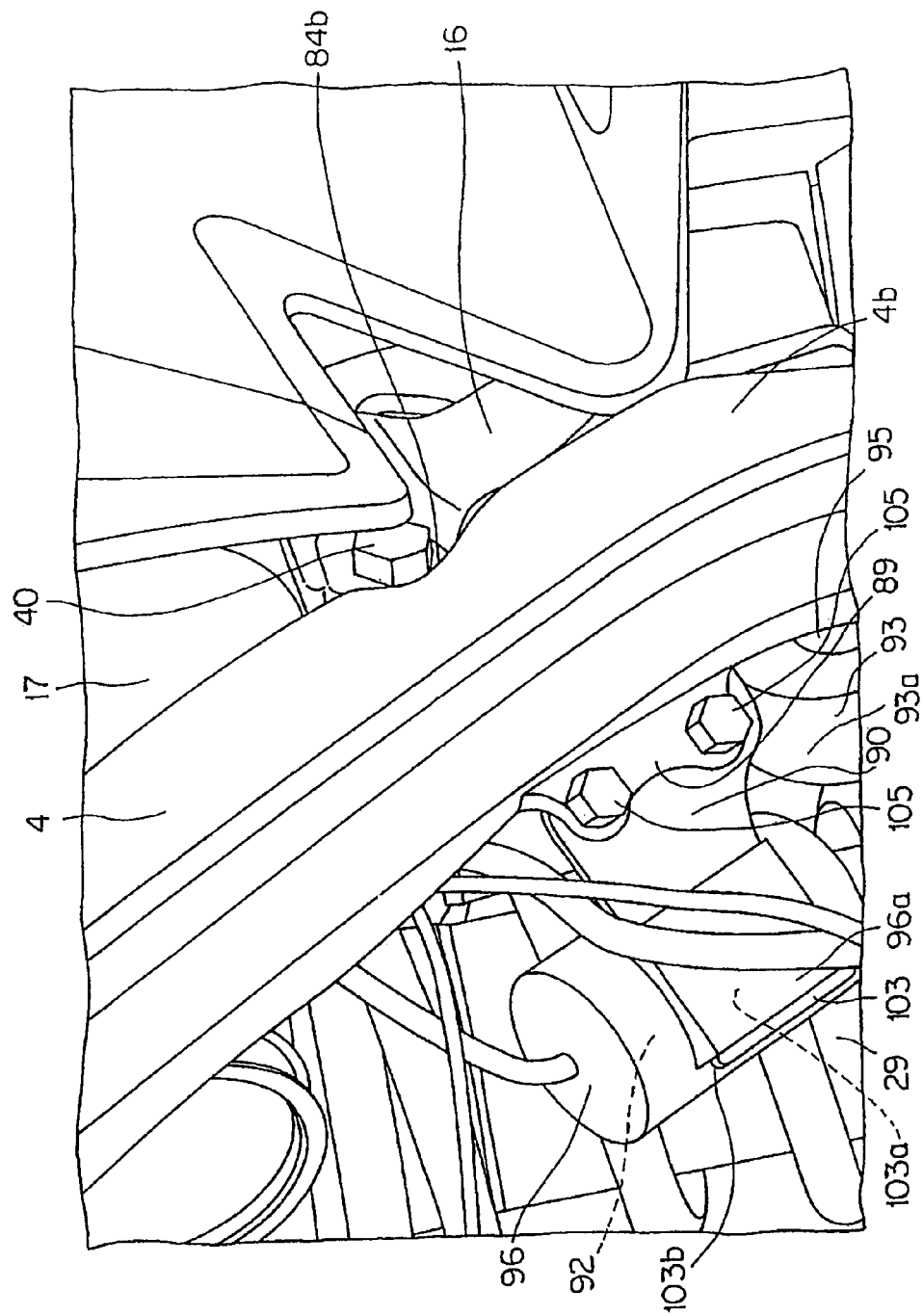
FIG. 6 is a perspective view of the center frame on the left side when obliquely seen from a front-lateral side of the outside of the vehicle.

FIG. 3 is an enlarged side view showing the vicinity of the center frame 4 shown in FIG. 1. FIG. 4 is a side view when seen from a side opposite of FIG. 3, and FIG. 5 is a perspective view when FIG. 4 is obliquely seen from the right-front side of the vehicle body. Further, FIG. 6 is a perspective view of the center frame on the left side when obliquely seen from the front-lateral side of the vehicle body, and is a view showing an attachment section of the electrical component bracket.

Note that, in FIGS. 3 to 5, a part of the center frame 4 is shown by a dashed-two dotted line to simplify explanation. In FIGS. 3 and 6, the left side of the drawing is the front of the vehicle body. In FIGS. 4 and 5, the right side of the drawing is the front of the vehicle body.

On the inside surface 4c of the center frame 4L on the left side of the vehicle body, a regulator 91 (electrical component) and a capacitor 92 are attached via the electrical component bracket 90.

The regulator 91 is connected with an AC generator (not shown) embedded in the front section of the crank case 9 by an AC generator wire, and an alternating-current power supply generated by the AC generator is sent to the regulator 91. The alternating-current power supply is rectified by the capacitor 92, and then is sent to an ignition coil, a headlight (which is unnecessary in the case of a racing two-wheeled motor vehicle), or the like.

The regulator 91 has an approximate hexagonal shape, and is provided with plural radiator fins on the outer circumference surface thereof.

As shown in FIG. 4, the capacitor 92 is attached to an oblique side of the regulator 91, the oblique side being a lower-front side in the vehicle body direction. As shown in FIG. 6, the exterior of the capacitor 92 is covered by a capacitor cover 96, and is waterproofed by closing a gap of the capacitor cover 96 by potting. The capacitor cover 96 is formed of a resin material having elasticity and insulation properties, and the outer circumference section of the capacitor cover 96 is formed with a slit section 96a to which a hook section 103a (details will be described later, see FIG. 7) of the electrical component bracket 90 is inserted.

The regulator 91 and the capacitor 92 are located behind the engine 7, thereby being hardly affected by heat from the engine 7. Further, the regulator 91 is attached in an inside portion where the right and left center frames 4 oppose each other, thereby being hidden by the center frame 4 when seen from the lateral side of the vehicle body and improving the appearance of the two-wheeled motor vehicle. Further, the regulator 91 and the capacitor 92 are attached on the left side of the vehicle body which is the opposite side of the exhaust pipe 20 (arranged on the right side of the vehicle body) so as not to be influenced by heat form the exhaust pipe 20. Since traveling wind easily enters the vehicle inner side of the right and left center frames 4, the traveling wind can cause the regulator 91 and the capacitor 92 to be cooled effectively.

Figure 7A:
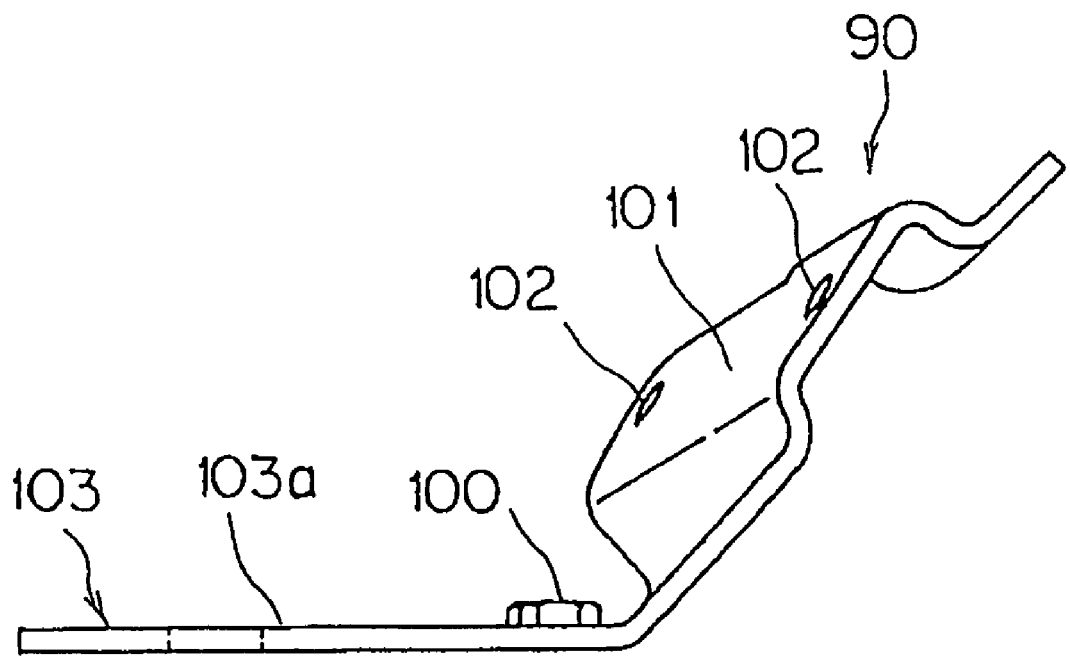
FIG. 7(a) is a plan view of an electrical component bracket.
Figure 7B:
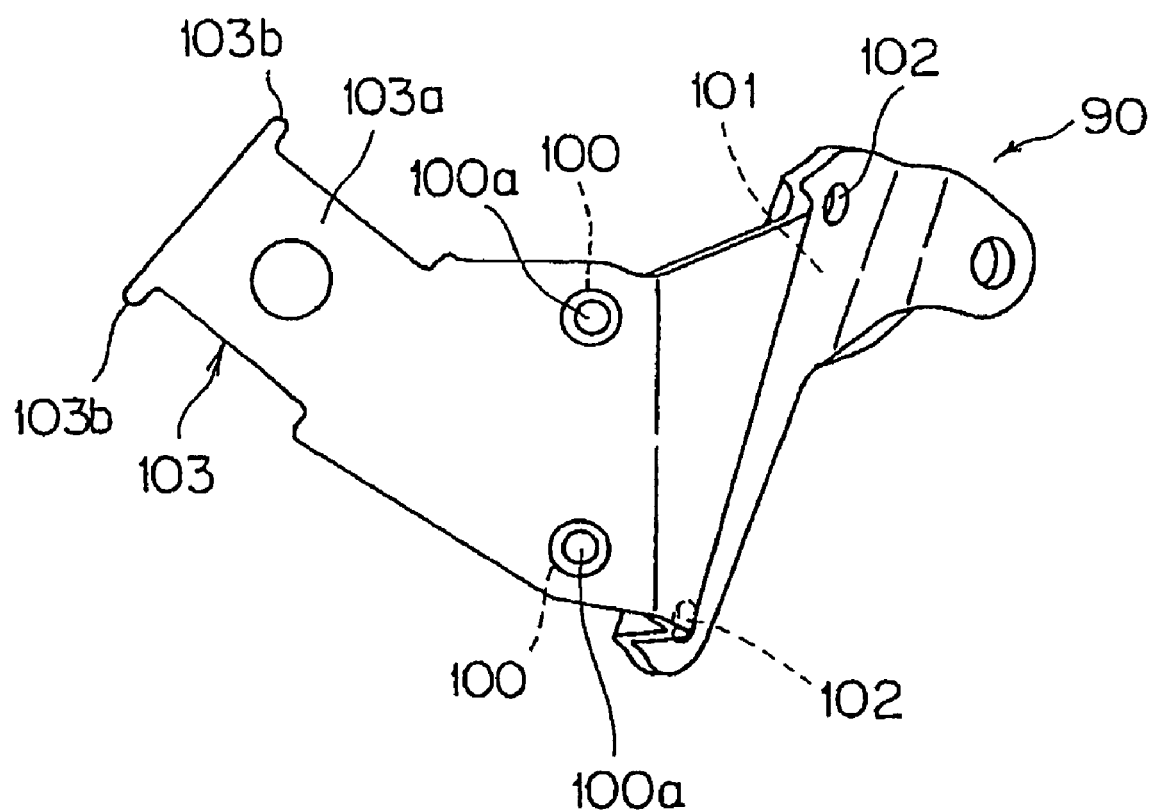
FIG. 7(b) is a front view thereof.

FIG. 7(a) is a plan view of the electrical component bracket 90, and FIG. 7(b) is a front view thereof.

The electrical component bracket 90 is formed by bending a steel plate, and as shown in FIG. 7(b), two weld nuts 100 are welded in a center section with a vertical interval therebetween. As shown in FIG. 6, an attachment hole 100a of the weld nut 100 is arranged in a position corresponding to the attachment hole 89a of the flange section 89 of the center frame 4L, described above, and is tightened to the flange section 89 by a bolt 105.

As shown in FIG. 7(b), the electrical component bracket 90 is bent obliquely at a portion on the right side of the weld nut 100 in the drawing, and an attachment surface 101 for attaching the regulator 91 is formed in this portion. The attachment surface 101 has a step in order to ensure rigidity of the bracket, and the attachment surface 101 is provided with two attachment holes 102. An attachment hole (not shown) of the regulator 91 is aligned with the attachment hole 102, and the regulator 91 is fixed thereto by a bolt 104 (see FIG. 8).

The electrical component bracket 90 is also provided with a capacitor attachment section 103 in a portion on the left side of the weld nut 100 in the drawing. As shown in FIG. 7(b), the capacitor attachment section 103 includes the hook section 103a and a locking nail 103b protruding from both sides of the tip end of the hook section 103a.

As shown in FIG. 6, the hook section 103a is inserted to the slit section 96a of the capacitor cover 96, and the capacitor 92 is fixed to the electrical component bracket 90 by the elasticity of the capacitor cover 96. As shown in FIG. 6, in a state where the hook section 103a is inserted to the slit section 96a, the locking nail 103b is located on the outside of the slit section 96a to be hooked to an edge section of the slit section 96a. Thus, the capacitor 92 is hardly displaced with respect to the electrical component bracket 90.

Figure 8:
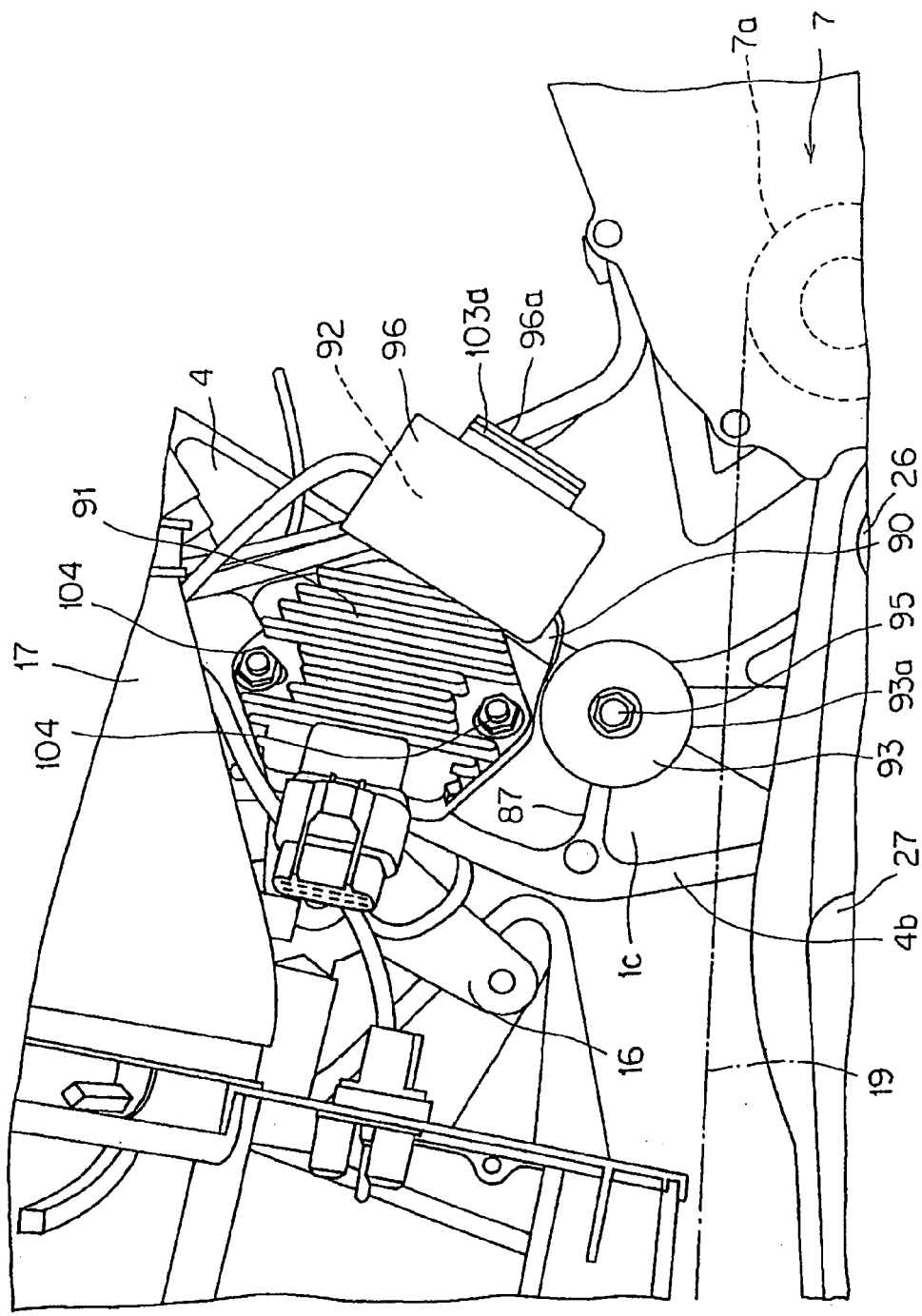
FIG. 8 is a view of the center frame on the left side of the body when seen from the inner side of the vehicle body.

FIG. 8 is a view of the center frame 4L on the left side when seen from the inner side of the vehicle body, and shows a state where the regulator 91 is attached. Note that, in FIG. 8, the right side of the drawing is the front of the vehicle body.

The drive chain 19 described above is arranged on the left side of the vehicle body, and the drive chain 19 moves to the upper side according to the swinging movement of the rear swing arm 27. Therefore, the chain roller 93 (interference prevention member) is attached to the lower side of the regulator 91 so that the regulator 91 and the capacitor 92 and do not interfere with the drive chain 19.

As shown in FIGS. 6 and 8, the chain roller 93 is attached to the inside surface 4c of the center frame 4L by a shaft 95. The shaft 95 is configured to be capable of adjusting the position of the chain roller 93 in the vehicle body width direction. The chain roller 93 is revolvable around the shaft 95. Accordingly, in a case where the drive chain 19 is moved to the regulator 91 side when the rear swing arm 27 is swung to the upper side, the drive chain 19 and an outer circumference section 93a of the chain roller 93 come into contact.

The regulator 91 is arranged in a lowest possible portion in the vehicle body above the drive chain 19. Accordingly, even when a heavy-weight component is embedded in the regulator 91, the center of gravity of the vehicle body can be lowered.

In the electrical component attachment structure for a two-wheeled motor vehicle according to the embodiment of the present invention, the regulator 91 and the capacitor 92 are arranged behind the engine 7, thus being hardly influenced by heat of the engine 7. Since the space in the vicinity of the engine 7 is not taken up by the arrangement space of the regulator 91 and the capacitor 92, an accessory having a large weight can be arranged in the vicinity of the engine 7. Accordingly, the center of gravity and balance of the vehicle body can be kept in a favorable state. Further, since the regulator 91 and the capacitor 92 are arranged in a position relatively close to the AC generator of the engine 7, the arrangement of the AC generator wire can be performed relatively easily.

Since the regulator 91 is arranged on the vehicle inner side of the right and left center frames 4, the regulator 91 can be hidden by the center frames 4 to improve the appearance of the vehicle body.

Further, the regulator 91 and the capacitor 92 are attached to the center frame 4L on the left side of the vehicle body which is the opposite to the right side of the vehicle body on which the exhaust pipe 20 is arranged, thus being hardly affected by heat from the exhaust pipe 20 which generates heat. Therefore, the reliability and durability of the regulator 91 and the capacitor 92 can be improved.

Since the chain roller 93 which restricts the upward movement of the drive chain 19 is provided between the drive chain 19 and each of the regulator 91 and the capacitor 92, the drive chain 19 first comes into contact with the outer circumference section 93a of the chain roller 93 even if a trajectory of the drive chain 19 comes close to the regulator 91 and the capacitor 92 due to a swinging operation of the rear swing arm 27, a slack of the drive chain 19, or the like. Thus, the drive chain 19 does not interfere with the regulator 91 and the capacitor 92. Accordingly, the reliability of the regulator 91 and the capacitor 92 can be maintained.

Further, according to the embodiment of the present invention, the capacitor 92 is covered by the capacitor cover 96 having elasticity; the capacitor cover 96 is provided with the slit section 96a; the hook section 103a of the electrical component bracket 90 is inserted to the slit section 96a; and the capacitor 92 is fixed to the electrical component bracket 90 by the elasticity of the slit section 96a. Thus, the capacitor 92 can be fixed to the electrical component bracket 90 without using a tightening member such as a screw. Therefore, attachment and maintenance work becomes easy.

The embodiment of the present invention has been described above. However, various modifications and changes are possible based on the technical idea of the present invention.

For example, the chain roller 93 for preventing the interference between the regulator 91 and the like and the drive chain 19 is provided in this embodiment, but it is not limited to a roller. That is, the interference prevention member may have a plate shape, as long as the interference is prevented.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An electrical component attachment structure for a two-wheeled motor vehicle, comprising:
   a main frame which supports an engine,
   left and right center frames extending vertically behind the engine,
   a rear swing arm swingably supported by a pivot shaft provided to said left and right center frames, and
   a drive chain disposed along said rear swing arm, said drive chain transmitting a driving force from the engine to a rear wheel,
   wherein an electrical component is arranged on a vehicle inner side of said left and right center frames, above said drive chain and behind said engine.

2. The electrical component attachment structure for a two-wheeled motor vehicle according to claim 1, wherein the electrical component is attached to one of said left and right center frames which is on an opposite side of the vehicle relative to an exhaust pipe in a vehicle width direction.

3. The electrical component attachment structure for a two-wheeled motor vehicle according to claim 1, further comprising an interference prevention member provided between said drive chain and the electrical component, said interference prevention member restricting upward movement of said drive chain.

4. The electrical component attachment structure for a two-wheeled motor vehicle according to claim 2, further comprising an interference prevention member provided between said drive chain and the electrical component, said interference prevention member restricting upward movement of said drive chain.

5. The electrical component attachment structure for a two-wheeled motor vehicle according to claim 1, further comprising a bracket for attaching the electrical component to one of said left and right center frames,
   wherein a rectifier capacitor is attached to said bracket.

6. The electrical component attachment structure for a two-wheeled motor vehicle according to claim 2, further comprising a bracket for attaching the electrical component to said one of said left and right center frames which is on the opposite side of the vehicle relative to the exhaust pipe in a vehicle width direction,
   wherein a rectifier capacitor is attached to said bracket.

7. The electrical component attachment structure for a two-wheeled motor vehicle according to claim 3, further comprising a bracket for attaching the electrical component to one of said left and right center frames,
   wherein a rectifier capacitor is attached to said bracket.

8. The electrical component attachment structure for a two-wheeled motor vehicle according to claim 4, further comprising a bracket for attaching the electrical component to said one of said left and right center frames which is on an opposite side of the vehicle relative to an exhaust pipe in a vehicle width direction,
   wherein a rectifier capacitor is attached to said bracket.

* * * * *